United States Patent
Le et al.

(10) Patent No.: US 6,293,636 B1
(45) Date of Patent: Sep. 25, 2001

(54) DEVICE RETENTION ASSEMBLY

(75) Inventors: Bao G. Le, Orange; Derek T. Nguyen, Foothill Ranch; Lisa Luong, Trabuco Canyon, all of CA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/475,781

(22) Filed: Dec. 30, 1999

(51) Int. Cl.$^7$ ...................................................... A47B 88/00
(52) U.S. Cl. ............................... 312/223.2; 292/DIG. 37; 361/732; 361/683
(58) Field of Search ............................. 312/223.1, 223.2, 312/265.5, 263, 257.1; 361/685, 725, 726, 727, 732, 724, 683; 439/928.1; 292/175, DIG. 37, 42, 109, 218, 202

(56) References Cited

U.S. PATENT DOCUMENTS

| | | |
|---|---|---|
| D. 338,664 | 8/1993 | Goff . |
| 4,532,564 | 7/1985 | Larson et al. . |
| 4,694,380 | 9/1987 | Mallory et al. . |
| 4,896,777 | 1/1990 | Lewis . |
| 4,914,550 | 4/1990 | Filsinger et al. . |
| 4,960,384 | 10/1990 | Singer et al. . |
| 4,977,532 | 12/1990 | Borkowicz et al. . |
| 4,980,800 | 12/1990 | Furuta . |
| 5,003,431 | 3/1991 | Imsdahl . |
| 5,031,070 | 7/1991 | Hsu . |
| 5,067,041 | 11/1991 | Cooke et al. . |
| 5,098,175 | 3/1992 | Cooke et al. . |
| 5,100,215 | 3/1992 | Cooke et al. . |
| 5,112,119 | 5/1992 | Cooke et al. . |
| 5,121,296 | 6/1992 | Hsu . |
| 5,142,447 | 8/1992 | Cooke et al. . |
| 5,164,886 | 11/1992 | Chang . |
| 5,175,670 | 12/1992 | Wang . |
| 5,216,582 | 6/1993 | Russell et al. . |
| 5,222,897 | 6/1993 | Collins et al. . |
| 5,235,493 * | 8/1993 | Yu ................................. 312/223.2 X |
| 5,253,129 | 10/1993 | Blackborow et al. . |
| 5,277,615 | 1/1994 | Hastings et al. . |
| 5,297,009 | 3/1994 | Gelez et al. . |
| 5,299,095 | 3/1994 | Feuerlein et al. . |
| 5,299,944 | 4/1994 | Larabell et al. . |
| 5,321,962 | 6/1994 | Ferchau et al. . |
| 5,325,263 | 6/1994 | Singer et al. . |
| 5,332,306 | 7/1994 | Babb et al. . |
| 5,333,097 | 7/1994 | Christensen et al. . |
| 5,340,340 | 8/1994 | Hastings et al. . |
| 5,392,192 | 2/1995 | Dunn et al. . |
| 5,460,441 | 10/1995 | Hastings et al. . |
| 5,481,431 | 1/1996 | Siahpolo et al. . |
| 5,495,389 | 2/1996 | Dewitt et al. . |

(List continued on next page.)

Primary Examiner—Peter M. Cuomo
Assistant Examiner—Jerry A. Anderson
(74) Attorney, Agent, or Firm—Suiter & Associates PC; Kevin E. West

(57) ABSTRACT

A device cage assembly for retaining a device such as a drive or the like within the chassis of an information handling system is described. The device cage assembly includes a device cage disposed within the chassis so as to be capable of being moved between a retracted or closed position, wherein the device cage is fully contained within the chassis, and an extended or open position wherein the device cage assembly is positioned at least partially outside of the chassis. A device retention assembly is attached to the device cage for retaining the device in the device cage. The device retention assembly is comprised of a body suitable for attachment to the device cage within the chassis of the information handling system. An appendage, such as an appendage, post, or the like is mounted to the body and extends into the device cage for engaging the device. A latching assembly secures the body to the device cage so that the retaining device is held in engagement with the device to retain the device in the device cage.

25 Claims, 6 Drawing Sheets

U.S. PATENT DOCUMENTS

| | | |
|---|---|---|
| 5,496,181 | 3/1996 | Addison et al. . |
| 5,502,604 | 3/1996 | Furay . |
| 5,510,955 | 4/1996 | Taesang . |
| 5,518,412 | 5/1996 | Larabell . |
| 5,524,104 | 6/1996 | Iwata et al. . |
| 5,541,579 * | 7/1996 | Kiernan . |
| 5,557,499 | 9/1996 | Reiter et al. . |
| 5,564,585 | 10/1996 | Saitoh . |
| 5,566,383 | 10/1996 | Gildea et al. . |
| 5,571,256 | 11/1996 | Good et al. . |
| 5,584,396 | 12/1996 | Schmitt . |
| 5,586,003 | 12/1996 | Schmitt et al. . |
| 5,587,856 | 12/1996 | Aoyama . |
| 5,588,728 | 12/1996 | Eldridge et al. . |
| 5,599,080 | 2/1997 | Ho . |
| 5,602,696 | 2/1997 | Hanson . |
| 5,652,695 | 7/1997 | Schmitt . |
| 5,652,697 | 7/1997 | Le . |
| 5,673,171 | 9/1997 | Varghese et al. . |
| 5,673,172 | 9/1997 | Hastings et al. . |
| 5,680,293 | 10/1997 | McAnally et al. . |
| 5,680,295 | 10/1997 | Le et al. . |
| 5,682,291 | 10/1997 | Jeffries et al. . |
| 5,683,159 | 11/1997 | Johnson . |
| 5,687,059 | 11/1997 | Hoppal . |
| 5,694,266 | 12/1997 | Bloom et al. . |
| 5,708,563 | 1/1998 | Cranston, III et al. . |
| 5,713,647 | 2/1998 | Kim et al. . |
| 5,724,227 | 3/1998 | Hancock et al. . |
| 5,726,864 | 3/1998 | Copeland et al. . |
| 5,726,922 | 3/1998 | Womble et al. . |
| 5,730,515 | 3/1998 | Ho . |
| 5,734,557 | 3/1998 | McAnally et al. . |
| 5,737,185 | 4/1998 | Morrison et al. . |
| 5,779,496 | 7/1998 | Bolinger et al. . |
| 5,781,408 | 7/1998 | Crane, Jr. et al. . |
| 5,783,771 | 7/1998 | Copeland et al. . |
| 5,784,251 | 7/1998 | Miller et al. . |
| 5,785,402 | 7/1998 | DeLorenzo . |
| 5,790,373 | 8/1998 | Kim et al. . |
| 5,801,920 | 9/1998 | Lee . |
| 5,805,420 | 9/1998 | Burke . |
| 5,808,864 | 9/1998 | Jung . |
| 5,850,925 | 12/1998 | Gandre . |
| 5,852,739 | 12/1998 | Radloff et al. . |
| 5,865,518 | 2/1999 | Jarrett et al. . |
| 5,867,369 | 2/1999 | Antonuccio et al. . |
| 5,875,068 | 2/1999 | Sawada . |
| 5,877,938 | 3/1999 | Hobbs et al. . |
| 5,886,869 | 3/1999 | Fussell et al. . |
| 5,896,273 | 4/1999 | Varghese et al. . |
| 5,914,854 | 6/1999 | Holt . |
| 5,914,855 | 6/1999 | Gustafson et al. . |
| 5,924,780 | 7/1999 | Ammon et al. . |
| 5,926,916 | 7/1999 | Lee et al. . |
| 5,928,016 | 7/1999 | Anderson et al. . |
| 5,948,087 | 9/1999 | Khan et al. . |
| 5,963,431 | 10/1999 | Stancil . |
| 5,973,934 | 10/1999 | Roscoe . |

\* cited by examiner

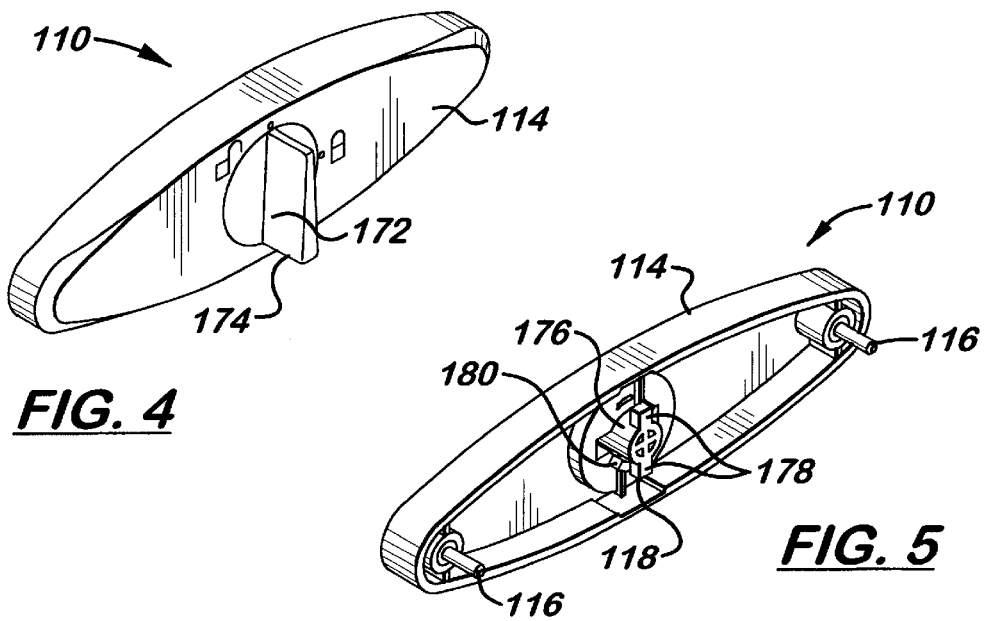
FIG. 4
FIG. 5
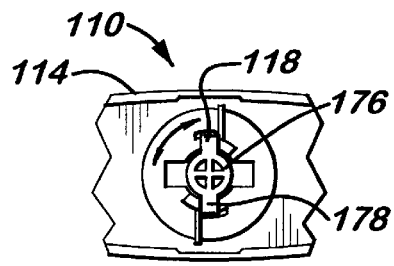
FIG. 6
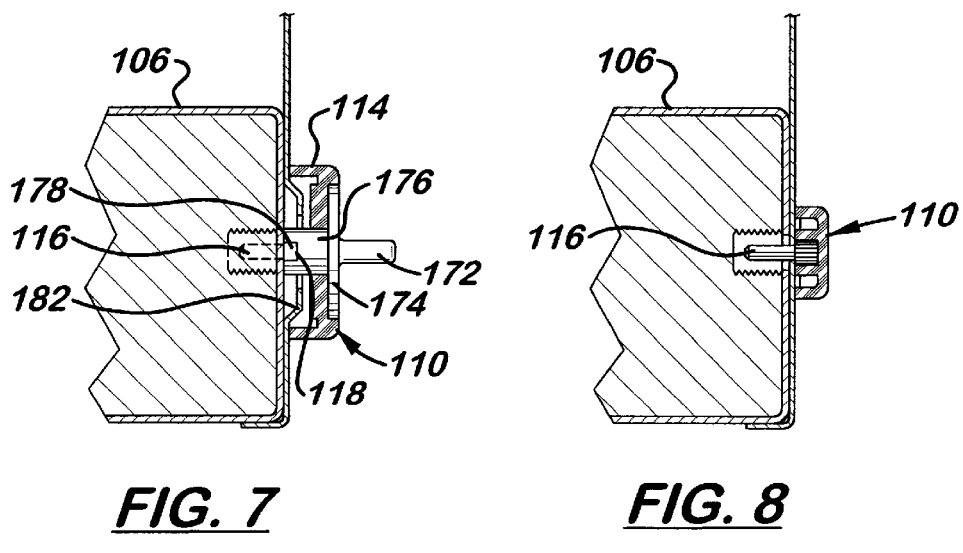
FIG. 7    FIG. 8

DEVICE RETENTION ASSEMBLY

FIELD OF THE INVENTION

The present invention generally relates to the field of information handling systems, and particularly to apparatus for retaining devices such as disk drives and the like within the chassis of an information handling system.

BACKGROUND OF THE INVENTION

The chassis of a typical information handling system is provided with a cage like structure mounted near the chassis' front bezel for holding devices such as floppy disk drives, optical disc drives, tape drives, and the like which may require frequent access by users of the system. In existing information handling systems, this device cage is comprised of a fixed metal frame mounted within the chassis. The frame may be divided into one or more bays each sized to retain a device having a particular industry standard size and shape, for example a 5.25 inch half height device, a 3.5 inch device, or the like. Devices installed in the device cage are retained within the bays via screws that extend through the sides of the frame into the bay to engage holes pre-positioned in the device. Alternately, the devices may slide into the bay via rails formed in the frame. The devices are then attached to the rails by screws so that they are secured within the cage.

Presently, installation and removal of devices in information handling systems is time consuming and requires the use of tools, such as a screwdriver or the like. For instance, in systems where devices are attached directly to the device cage frame with screws, an installer must hold each device so that mounting holes formed in the housing are aligned with holes formed in the frame while screws are inserted through the hole and tightened. Consequently, installation and removal of drives in such a system becomes awkward, especially when several drives are installed within the device cage. Systems employing rail installation methods are more convenient, since the drive does not have to be held in place during installation and removal, but may require removal of the chassis front bezel, as well as the use of tools to insert screws necessary to secure the device within the cage.

Consequently, it would be desirable to provide an improved device cage assembly for retaining a device such as a disk drive or the like within the chassis of an information handling system. Preferably, the device cage would allow easy access to devices contained within the cage for installation and removal, and would not require the use of tools, such as screwdrivers or the like, to install and remove devices.

SUMMARY OF THE INVENTION

Accordingly, the present invention is directed to an apparatus for retaining a device within the chassis of an information handling system. The apparatus allows insertion and removal of the devices without the use of screws or tools, or removal of the chassis' front bezel.

In an exemplary embodiment, the chassis of an information handling system includes a device cage assembly suitable for mounting devices, particularly those which may require frequent access by users of the information handling system such as optical disc drives, floppy disk drives and the like. The device cage assembly includes a device cage disposed within the chassis that is capable of being moved between a retracted or closed position, wherein the device cage is substantially contained within the chassis, and an extended or open position wherein the device cage assembly is positioned at least partially outside of the chassis. In one embodiment, the device cage assembly may be completely removed from the chassis providing greater ease of access to devices mounted therein.

In one embodiment of the invention, a device retention assembly is attached to a device cage, such as the removable device cage of the present invention, for retaining a device in the device cage. The device retention assembly is comprised of a body suitable for attachment to the device cage while fitting within the chassis of the information handling system. An appendage such as a pin, post, or the like is mounted to the body and extends into the device cage for engaging the device. A latching assembly secures the body to the device cage so the retaining device is held in engagement with the device to retain the device in the device cage.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is an isometric view of an exemplary device retention assembly suitable for retaining a device in the device cage shown in FIG. 1;

FIG. 5 is an isometric view of the device retention assembly shown in FIG. 4, further illustrating the inner surface of the assembly;

FIG. 6 is a cross-sectional end elevational view of the device retention assembly shown in FIG. 4 taken through the assembly's latching mechanism and illustrating engagement latching mechanism with the device cage;

FIG. 7 is a cross-sectional end elevational view of the device retention assembly shown in FIG. 4 taken through a retaining appendage of the assembly and illustrating engagement of the appendage with a device positioned in the device cage;

FIG. 8 is a partial side elevational view of the inside of the device retention assembly illustrating the latching mechanism;

DETAILED DESCRIPTION OF THE INVENTION

Figure 1:
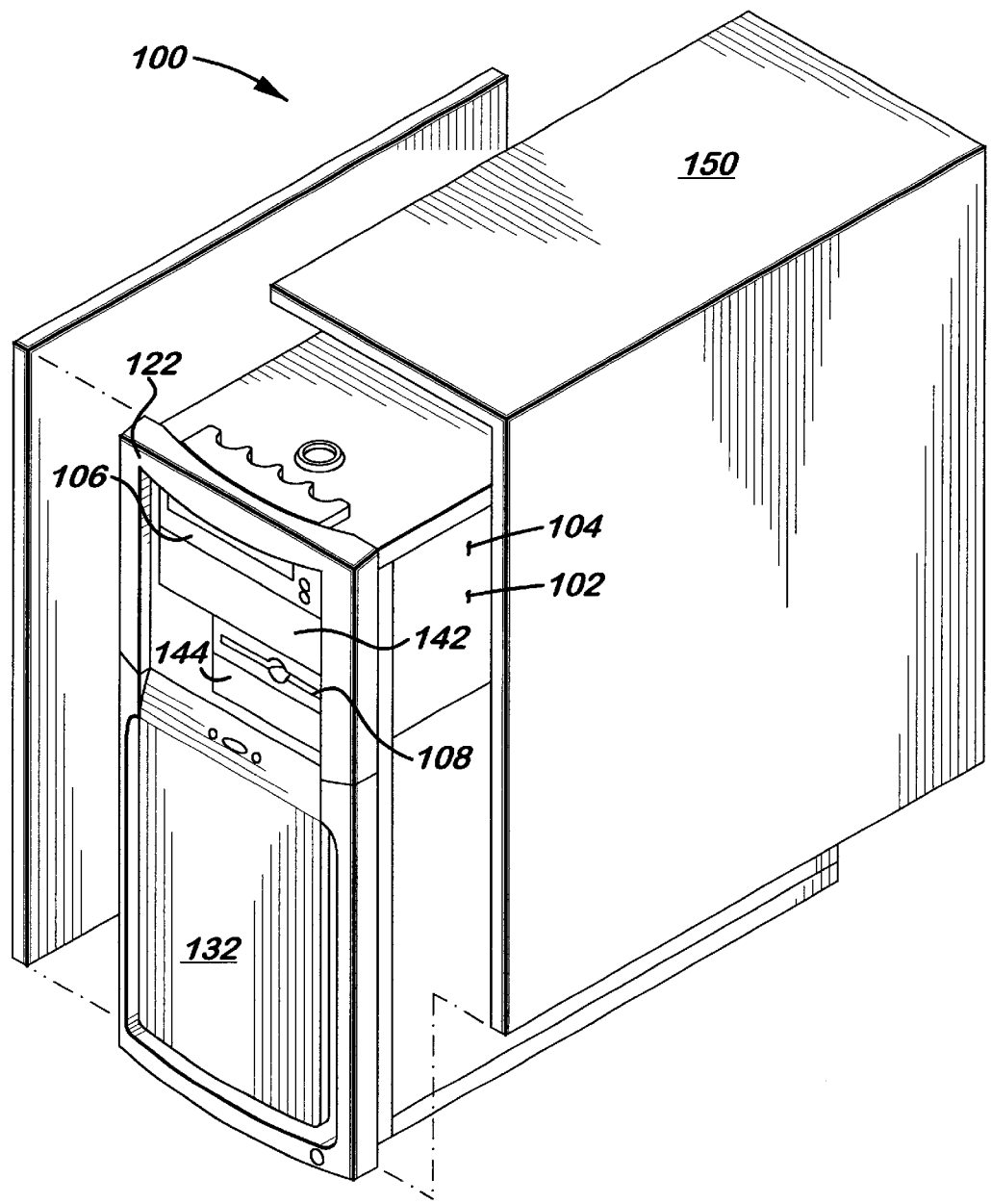
FIG. 1 is an isometric view of a chassis of an information handling system employing a device cage assembly in accordance with an exemplary embodiment of the present invention, wherein the device cage is shown in a closed position within the chassis.

Reference will now be made in detail to presently preferred embodiments of the invention, examples of which are illustrated in the accompanying drawings.

Referring generally to FIGS. 1 through 13, an information handling system having a chassis in accordance with an exemplary embodiment of the present invention is described. The information handling system chassis 100 includes a device cage assembly 102 for mounting devices of the information handling system, particularly those which may require frequent access by users of the information handling system such as an optical disc drive 106 and a floppy disk drive 108. The device cage assembly 102 includes a device cage 104 disposed within the chassis 100 so as to be capable of being moved between a retracted or closed position, shown in FIG. 1, wherein the device cage 104 is substantially contained within the chassis 100, and an extended or open position, shown in FIG. 2, wherein the device cage 104 is positioned at least partially outside of the chassis 100. In one embodiment, shown in FIG. 3, the device cage 104 may be completely removed from the chassis 100 for providing greater ease of access to devices, such as drives 106 & 108, mounted therein.

In an exemplary embodiment of the invention, the device cage assembly 102 may further include one or more device retention assemblies 110 & 112 for retaining devices, such as drives 106 &108 respectively, within the device cage 104. Each device retention assembly 110 & 112 is attached to the device cage 104 and engages a device, for example drives 106 & 108, contained therein to retain the device within the device cage 104. In one embodiment, the device retention assembly 110 & 112 is comprised of a body 114 (FIGS. 4 & 5) suitable for attachment to the device cage 104 while fitting within the chassis 100 of the information handling system. An appendage 116 such as a pin, post, or the like is mounted to the body 114 and extends into the device cage 104 for engaging the device. A latching assembly 118 engages the device cage 104 for securing the body 114 to the device cage 104 so that the retaining device 116 is held in engagement with the device retaining it in the device cage 104. In one embodiment, shown in FIGS. 4 through 8, the latching assembly and appendages are separate. However, in an alternate embodiment, shown in FIGS. 12 and 13, the latching assembly 118 (as shown in FIG. 5) may be combined with the appendage 116 thereby reducing the number of apertures that must be formed in the device cage 104.

Figure 2:
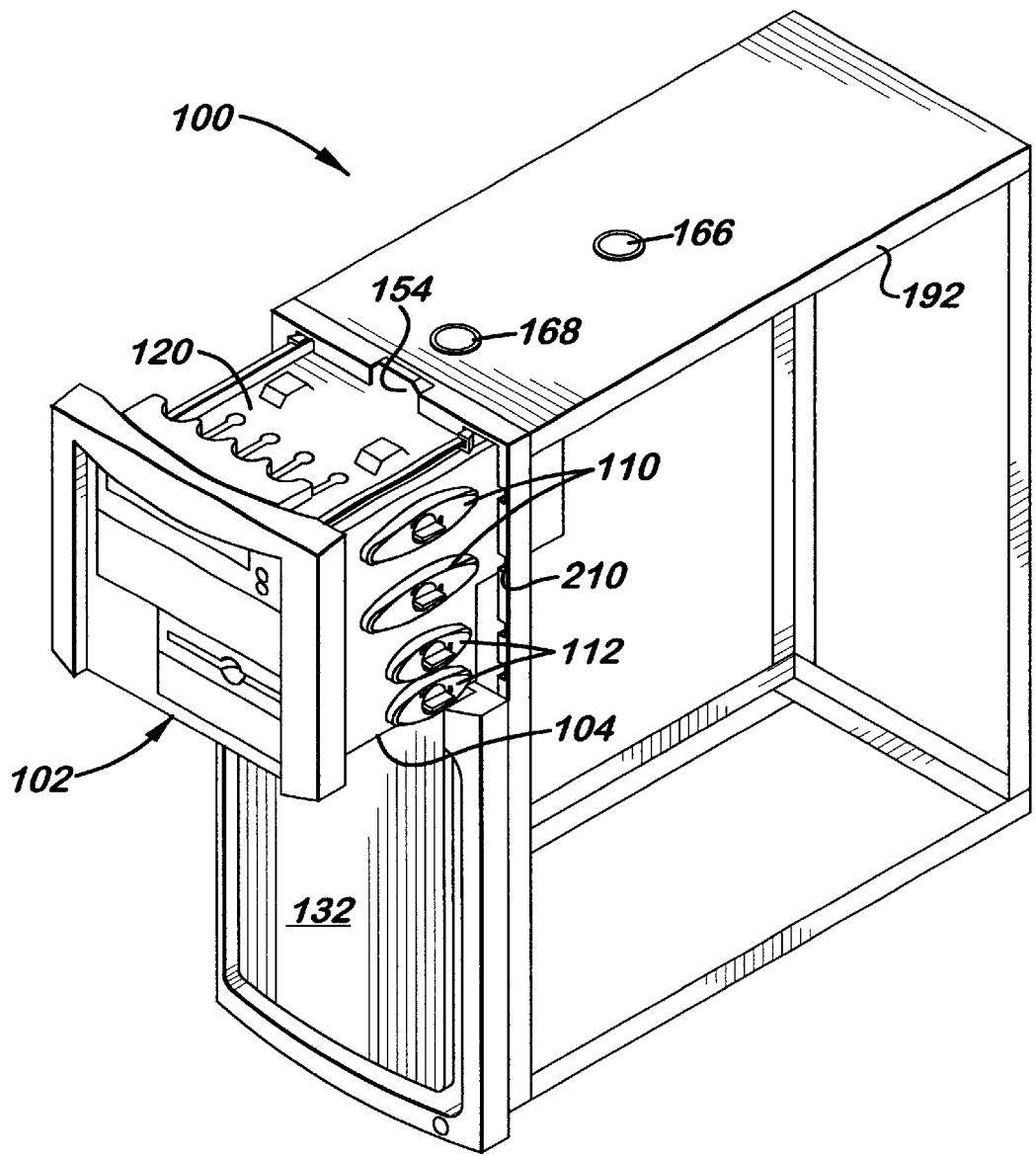
FIG. 2 is an isometric view of the information handling system chassis shown in FIG. 1, wherein the device cage assembly is shown in an open position.
Figure 3:
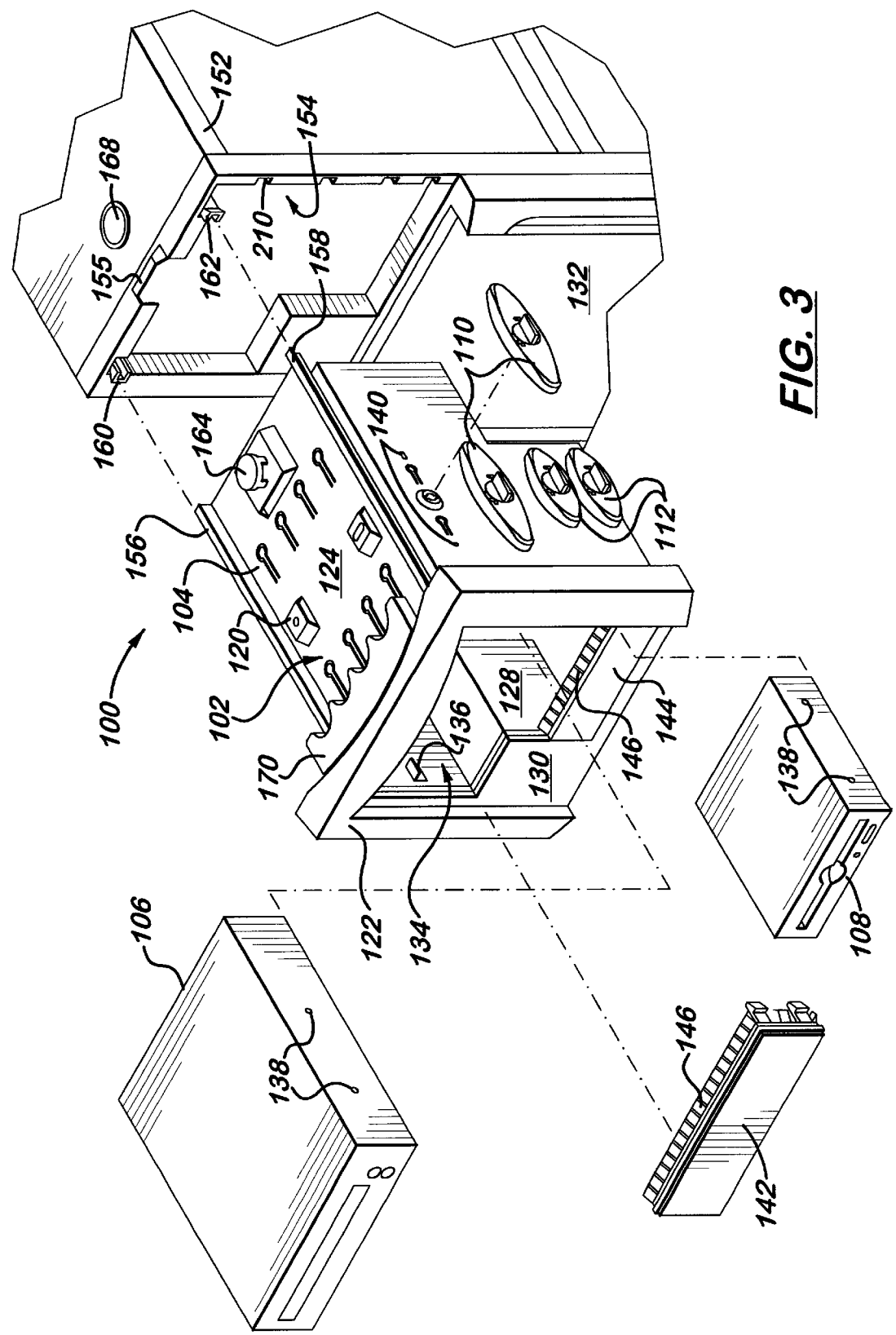
FIG. 3 is an exploded isometric view of the information handling system chassis shown FIG. 1, wherein the device cage assembly is shown removed from the chassis of the information handling system.

Referring specifically now to FIGS. 1, 2 and 3, an exemplary device cage assembly is described in detail. The device cage 104 of device cage assembly 102 is comprised of a generally box shaped enclosure 120 having a front bezel portion 122, a top wall portion 124 and first and second side wall portions 126 & 128. As shown in FIG. 3, the portions of the bottom and rear of the enclosure 120 remain open. In one embodiment, the enclosure 120 is formed of a conductive metal such as steel suitable for grounding the device to the information appliance chassis 100 and shielding the device against electromagnetic interference (EMI). However, it will be appreciated by those skilled in the art that the enclosure 120 may be manufactured from other materials, such as plastic, composites, and the like without departing from the scope and spirit of the present invention. Further, the front bezel portion 122 may comprise a fascia 130 molded to conform to the contour of the chassis' front bezel 132 while the device cage assembly 102 is retracted or closed, thereby giving the chassis 100 a uniform, finished appearance.

The enclosure 120 is suitably sized to hold one or more devices having an industry standard size (height, width, and length). Typical devices that may be held within the enclosure 120 include optical disc drives 106 such as CD-ROM (Compact Disc-Read Only Memory) drives and DVD (Digital Video Disc) drives, floppy disk drives 108, combination floppy/optical disk drives, large capacity removable disk drives such as ZIP and JAZ drives (ZIP and JAZ are registered trademarks of Iomega Corporation), tape drives, hard disk drives, RAIDs (Redundant Array of Independent Disks) and the like as contemplated by a person of ordinary skill in the art. As shown in FIG. 3, enclosure 120 may be separated into a plurality of bays 134 each occupying a generally rectangular volume within the enclosure 120. The height, width and length of each bay 134 is suitable for holding a single device, although it is anticipated that two or more smaller devices may be placed in a bay sized for a larger device. Further, in one embodiment, the enclosure 120 may include differently sized bays each capable of holding devices having different industry standard sizes. For instance, in the embodiment shown in FIG. 3, side wall portion 128 of enclosure 120 may be suitably shaped so that the enclosure 120 includes two industry standard 5.25 inch half-height device bays, each capable of holding a 5.25 inch half-height device such as optical disc drive 106, and two industry standard 3.5 inch bays, each capable of holding a 3.5 inch device such as floppy disk drive. However, it should be appreciated that the size and shape of enclosure 120 and the number, and size of bays 134 provided in the enclosure 120 may be altered by one of ordinary skill in the art without departing from the scope and spirit of the invention. For instance, the number of bays 134 provided in enclosure 120 may be increased so that the enclosure 120 may hold additional devices. Similarly, the shape of one or more bays 134 within enclosure 120 may be altered to accommodate devices other than those specifically described herein (for example, devices having non-industry standard sizes).

Guides may be provided within each bay 134 for supporting and aligning devices, such as drives 106 & 108, inserted within the device cage 104. In one embodiment, shown in FIG. 3, the guides are comprised of tabs 136 formed in each side wall portion 126 & 128. These tabs 136 are arranged in generally horizontal rows spaced so that mounting holes 138 formed in the housings of devices inserted within the bays 134 of enclosure 120 are vertically aligned with holes 140 formed in side wall portion 126 through which appendages 116 of device retention assemblies 110 & 112 may extend to engage the device. In alternate embodiments of the invention, guides may be comprised of rails, channels, slides, or like structures as contemplated by one of ordinary skill in the art. Further, in other embodiments of the invention, the guides may be eliminated.

In a further alternative embodiment, one or more indentations, such as a spring finger or a dimple (not shown), may be positioned on the side wall opposite the device retention assembly receiving side wall 126. The indentation (s) is positioned such that they align with the mounting holes 138 on the side of the drives 106 or 108 opposite the device retention assembly receiving side when the drives 106 or 108 are fully inserted. Since the mounting holes on this opposite side are not being used for the device retention assemblies, the indentations may be used as insertion guides to indicate to a user via tactile feedback when the drive, 106 or 108, is properly inserted to its correct depth. When the indentations "click" or align with mounting holes 138 on the opposite side, the user will know that the drive, 106 or 108, is fully inserted, and that the mounting holes 138 on the device retention assembly receiving side 126 will be aligned with the holes 140.

Devices housed within the device cage 104 may be accessed by users of the information handling system through one or more apertures (a single aperture is shown) formed in the front bezel portion 122 of enclosure 120. For instance, a user may wish to access drives 106 & 108 to insert and remove removable media such as optical discs (CD-ROMs, DVDs, and the like), floppy disks, tape cartridges, large capacity removable disk drives (ZIP or JAZ drives), and the like as contemplated by one of ordinary skill in the art. Wherein a bay 134 of enclosure 120 does not contain a device, or alternately, contains a device, such as a hard disk drive, that is not physically accessed by users of the information handling system, blanks 142 & 144 may cover the portion of the aperture providing access to that bay 134. The blanks 142 & 144 protect the bay 134 and any non-accessed devices contained therein from environmental contamination, and optionally, if provided with electromagnetic shielding 146, from electromagnetic interference (EMI). As shown in FIG. 3, the open back and bottom of enclosure 120 may further allow access to devices, such as drives 106 & 108, from within the chassis 100 for attachment of cords, cables and the like to operably couple the devices to other components mounted within the chassis 100.

In an exemplary embodiment, access to the device cage assembly 102 is provided by first removing a cover 150 of the information handling system chassis 100 thereby exposing the chassis' internal frame 152. As shown in FIGS. 2 and 3, the frame 152 includes an aperture 154 sized and shaped to receive the device cage assembly 102. Support rails 156 & 158 are provided in top wall portion 124 adjacent to side wall portions 126 & 128. These support rails 156 & 158 engage channels 160 & 162 mounted to the chassis frame 152 within aperture 154 thereby allowing the device cage assembly 102 to slide between the retracted or closed position, shown in FIG. 1, wherein the device cage 104 is contained within the chassis 100, and the extended or open position wherein the device cage 104 is positioned substantially outside of the chassis 100. In one embodiment, shown in FIG. 3, support rails 156 & 158 may be disengaged from channels 160 & 162 allowing the device cage assembly 102 to be completely removed from the chassis frame 152.

Apparatus may be provided for securing the device cage assembly 102 in the fully opened and fully closed positions. As shown in FIGS. 2 and 3, such apparatus may be comprised of a spring biased button 164 mounted to top wall portion 124. The button 164 extends through holes 166 & 168 formed in the chassis frame 152 to secure the device cage assembly 102 in the fully closed and fully opened positions. A user wishing to open the device cage assembly 102, that is, slide the device cage assembly from the closed or retracted position to the opened or extended position, depresses button 164 through hole 166. The user may then slide the device cage assembly 102 from the closed position to the open position by grasping handle 170 mounted to enclosure 120 adjacent to front bezel portion 122 and pulling outward. As the device cage assembly 102 slides outward, button 164 is depressed by chassis frame 152. When device cage assembly 102 reaches the fully opened position, button 164 is extended through hole 168 by its internal spring, securing the device cage assembly in that position.

The user may close the device cage assembly 102, that is slide the device cage assembly 102 from the opened or extended position to the closed or retracted position by again depressing button 164 through hole 168 and pushing inward on the device cage assembly 102, sliding the device cage assembly 102 from the opened position to the closed position. When device cage assembly 102 reaches the fully closed position, button 164 is again extended through hole 166 by its internal spring, securing the device cage assembly in the fully closed position. Similarly, the device cage assembly 102 may be removed from the chassis frame 152 by depressing button 164 through hole 168 and pulling outward on the device cage assembly, sliding the device cage assembly 102 out of aperture 154 and disengaging support rails 156 & 158 from channels 160 & 162. The device cage assembly 102 may be reinserted into the chassis frame 152 by aligning and re-engaging support rails 156 & 158 with channels 160 & 162 and inserting enclosure 120 of device cage assembly 102 into aperture 154. Button 164 is depressed, either manually by the user, or, in an exemplary embodiment, automatically by an angled guide 155 formed in the chassis frame 152. The device cage assembly 102 may then be pushed inwardly until button 164 extends through hole 168, wherein the device cage assembly is in the opened position, or hole 166, wherein the device cage assembly is in the closed position.

Referring now to FIGS. 4 through 9, an exemplary device retention assembly, in particular drive retention assembly 110 shown in FIGS. 1, 2, and 3, is described in detail. It should however be appreciated that device retention assembly 112, as shown in FIGS. 1, 2, and 3, is substantially identical to drive retention assembly 110, being somewhat shortened in length for use with smaller devices, for example the 3.5 inch floppy disk drive 108. Consequently, the construction of device retention assembly 112 need not be independently described herein.

Device retention assembly 110 is comprised of an elongated, somewhat flattened body 114 having an outer face, shown in FIG. 4, and an inner face, shown in FIG. 5. When device retention assembly 110 is mounted to the device cage 104, as shown FIGS. 1, 2 and 3, the body 114 rests against enclosure 120 so that the inner surface of body 114 is generally flush against the outer surface of side wall portion 126. As shown in FIGS. 7 and 8, appendages 116 are positioned adjacent to the ends of body 114. In one embodiment, appendages 116 are comprised of pins extending from the inner face of body 114 into the bay 134 of enclosure 120 through a hole 140 formed in side wall portion 126 (see FIG. 3). Wherein a device, for example drive 106, is positioned in the bay 134, appendages 116 extend into the device's housing through mounting holes 138 (FIG. 3) formed therein, securing the device to the enclosure 120.

In an exemplary embodiment, mounting holes 138 are positioned on the device's housing according to industry standards or conventions. Thus, holes 140 may be positioned in side wall portion 126 of enclosure 120 so that they are aligned with the mounting holes 138 formed in the device's housing. In a further exemplary embodiment, appendages 116 may be made of a conductive metal such as steel, copper, brass, and the like. The bases of appendages 116 may be made sufficiently wide to cover holes 140 in side wall portion 126 of enclosure 120 to provide electrical contact between the device's housing and the enclosure 120 via the appendages 116 thereby providing a ground to the device.

A latching assembly 118 is mounted to body 114 for attaching the device retention assembly 110 to a side wall 126 of enclosure 120. In one embodiment, latching assembly 118 is comprised of a knob 172, having a flattened handle portion 174 that is grasped to turn the knob 172, extending from the outer face of body 114. The knob 172 may be turned through a ninety degree (90°) arc between an unlatched position and a latched position (the unlatched position is shown in FIG. 4). As shown in FIGS. 4, 5 and 6, the knob 172 is coupled to a shaft 176 extending through and retained in body 114. Thus, as shown in FIG. 6, when knob 172 is turned, shaft 176 is rotated through a corresponding arc. Shaft 176 is provided with one or more keys 178 suitable for engaging the side wall portion 126 of enclosure 120, as shown in FIG. 7, to secure the device retention assembly 110 to the device cage 104. Shaft 176 may further include one or more tabs 180 positioned to contact stops formed in the inner face of body 114 to prevent rotation of the shaft 176 past the latched and unlatched positions.

Figure 9:
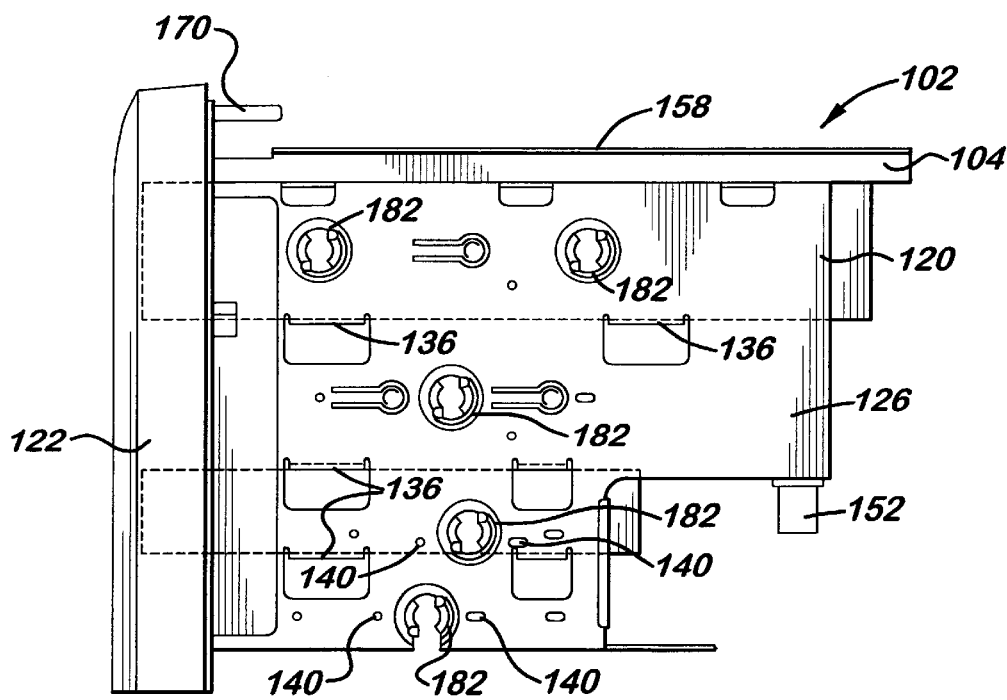
FIG. 9 is a side elevational view of the device cage assembly shown in FIG. 1.

In one embodiment, side wall portion 126 includes a plurality of latch apertures 182. Each aperture 182 is shaped to allow insertion and removal of the keyed shaft 176 when knob 172 is turned to the unlatched position, and to prevent removal (and insertion) of the keyed shaft 176 when the knob 172 is turned to the latched position. For example, as shown in FIG. 6, keys 178 may be formed on opposite sides of shaft 176. As shown in FIG. 9, latch apertures 182 suitable for engagement by shaft 176 are comprised of a circular hole having diametrically opposed notches through which shaft 176 and keys 178 may pass when knob 172 is in the unlatched position. When knob 172 is turned to the latched position, shaft 176 is rotated within latch aperture 182 so that keys 178 are moved behind side wall portion 126 thereby securing the device retaining assembly to the enclosure 120. As shown in FIG. 7, the area of the side wall portion 126 around the latch aperture may be raised so that shaft 176 need not be extended unnecessarily beyond the inner surface of body 114 to engage the latch aperture 182.

Indicia may be provided on the outer face of body 114 to aid the user in distinguishing whether the latching assembly 118 is latched or unlatched. For example, in the embodiment shown in FIG. 4, indicia, such as conventional representations of closed and open padlocks (shown, but not numbered), may be provided on the outer surface of body 114 adjacent to knob 172. The handle portion 174 of knob 172 may be tapered to form the shape of an arrow, wherein the point of the arrow points at the unlocked padlock when the latching assembly 118 is unlatched, and the locked padlock when the latching assembly 118 is latched.

Figure 10:
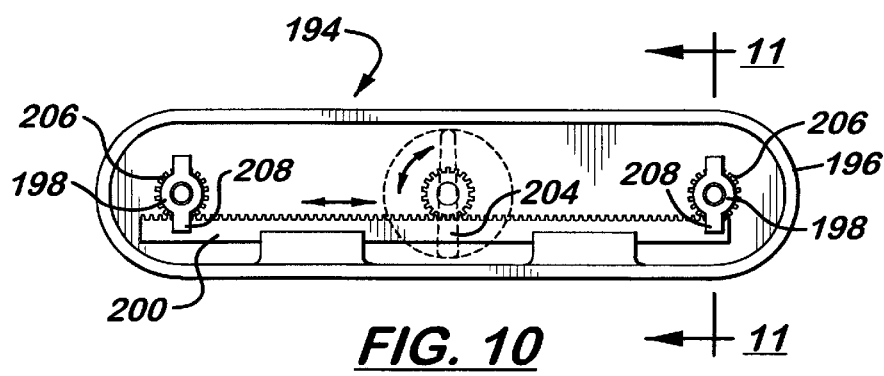
FIG. 10 is a side elevational view of a device retention assembly in accordance with an exemplary embodiment of the present invention, wherein each appendage of the assembly is provided a latching mechanism operated by a rack and pinion for securing the assembly to the device cage.
Figure 11:
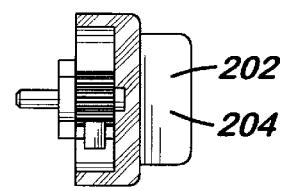
FIG. 11 is a cross-sectional end elevational view of the device retention assembly shown in FIG. 10, taken along line 11—11 through the retention appendage of the assembly.

FIGS. 1 through 8 illustrate an exemplary embodiment of the invention wherein the latching assembly and appendages of the device retainer apparatus are separate. Referring now to FIGS. 9, 10 and 11, an alternate device retaining assembly is shown wherein the latching assembly shaft is combined with the appendage thereby reducing the number of apertures that must be formed in the device cage. Device retention assembly 194, shown in FIGS. 10 and 11, like device retention assemblies 110 & 112 shown in FIG. 2, is comprised of an elongated, somewhat flattened body 196 having an outer face (not shown) and an inner face (the inner face is shown in FIG. 10). Appendages 198 are provided adjacent to the ends of body 196 for engaging and retaining a device within device cage 104 of device cage assembly 102. A latching assembly 200 is mounted in body 196 for attaching the device retention assembly 194 to a side wall portion 126 of enclosure 120 (see FIG. 9). As shown in FIG. 11, latching assembly 200 includes a knob 202, having a flattened handle portion 204 that is grasped to turn the knob 202, that extends from the outer face of body 196. As in the embodiment shown in FIGS. 4 through 8, the knob 202 may be turned through a ninety degree (90°) arc between an unlatched position and a latched position (the unlatched position is shown in FIGS. 10 and 11).

Knob 202 is coupled to keyed shafts 206 mounted to body 196 via rack and pinion 208. Shaft 206 includes one or more keys suitable for engaging the side wall portion 126 of enclosure 120, as shown in FIG. 9, to secure the device retention assembly 110 to the device cage 104. As knob 202 is turned, a gear coupled to knob 202 is rotated displacing the rack of rack and pinion 208 to rotate shafts 206. As shown in FIG. 10, the keyed shafts 206 may be positioned so that they are coaxial with appendages 198 (see FIG. 9). In one embodiment, appendages 198 may be fixed to body 196 and may extend through the center of keyed shafts 206, which are hollow, so that keyed shafts 206 may rotate about appendages 198. Alternately, keyed shafts 206 and appendages 198 may be a single component such that the appendages 198 rotate as keyed shafts 206 are rotated. As shown in FIG. 9, in an exemplary embodiment wherein device retention assembly 194 is utilized, as illustrated by the uppermost bay 134 of enclosure 120, side wall portion 126 may include two latch apertures 182 formed in side wall portion 126 and spaced to allow insertion and removal of keyed shafts 206 when knob 202 is turned to the unlatched position, and to prevent removal (and insertion) of the keyed shaft 206 when the knob 202 is turned to the latched position. Appendages 198 extend through these apertures 182. Thus, no additional holes, such as holes 140 need be provided in enclosure 120.

Referring again to FIGS. 1 through 8 in general, a device, for example, a drive such as optical disc drive 106 or floppy disk drive 108, may be installed within the device cage assembly 102 by moving the device cage 104 from the closed position, shown in FIG. 1, to the open position, shown in FIG. 2, or alternately removing the device cage 104 from the chassis 100 altogether, as shown in FIG. 3. The device to be installed is inserted into a bay 134 of device cage enclosure 120. For example, the device slide into device bay 134 through the aperture in front bezel portion 122 so that it rests on tabs 136 of enclosure 120. Alternately, wherein the device cage 104 is completely removed from the chassis 100, the device may be inserted through the open back of the enclosure 120. If a blank, for instance blank 142, has be utilized to cover the bay 134 into which the device is to be inserted, that blank 142 may be removed if necessary or desired to provide access to the device.

Device retaining assembly 110 or 112 is attached to enclosure 120 so that appendages 116 extend through holes 140 in side wall portion 126 into mounting holes 138 of the device's housing. During attachment of the device retaining assembly 110, latching assembly 118 is unlatched, that is, knob 172 is turned to the unlatched position so that keyed shaft 176 may extend through latch aperture 182. The device retaining assembly is then installed so that body 114 is flush with the side wall portion 126 of enclosure 120. Latching assembly 118 is then latched, securing the device retaining assembly 110 to the enclosure and retaining the device within the device cage 104. The device cage assembly 102 is then closed, being reinserted in the chassis 100 if necessary.

Removal of a device from the device cage assembly 102 is accomplished in a similar fashion. The device cage 104 is moved from the closed position, shown in FIG. 1, to the open position, shown in FIG. 2, or alternately removed from the chassis frame 152 altogether as shown in FIG. 3. The device retaining assembly 110 or 112 is then removed by turning knob 172 to the unlatched position, unlatching latching assembly 118. The device may then be removed from the device cage 104. For example, the device may be slid out of device bay 134 through the aperture in front bezel portion 122. Alternately, wherein the device cage assembly 102 is completely withdrawn from the chassis frame 152, the device may be removed through the open back of enclosure 120. A blank 142 may be used to cover the bay 134 from which the device is removed if desired. Alternately, another device may be inserted into the bay 134 as described, supra. The device cage assembly 102 is then closed, being reinserted in the chassis 100 if necessary.

Further, it will be appreciated that an entire device cage assembly 102 may be removed and replaced with a second device cage assembly 102. Thus, the present invention allows users of the information system to swap one set of devices, contained in a first device cage assembly 102, with a second set of devices, contained in a second device cage assembly 102. For example, in one embodiment, a user may configure the information handling system by replacing a first set of devices configured to perform a certain set of tasks with a second set of devices configured to perform a second set of tasks. Similarly, a user may update an information handling system containing obsolete devices by replacing the device cage assembly 102 containing the obsolete devices with a device cage assembly 102 containing new devices.

Figure 12:
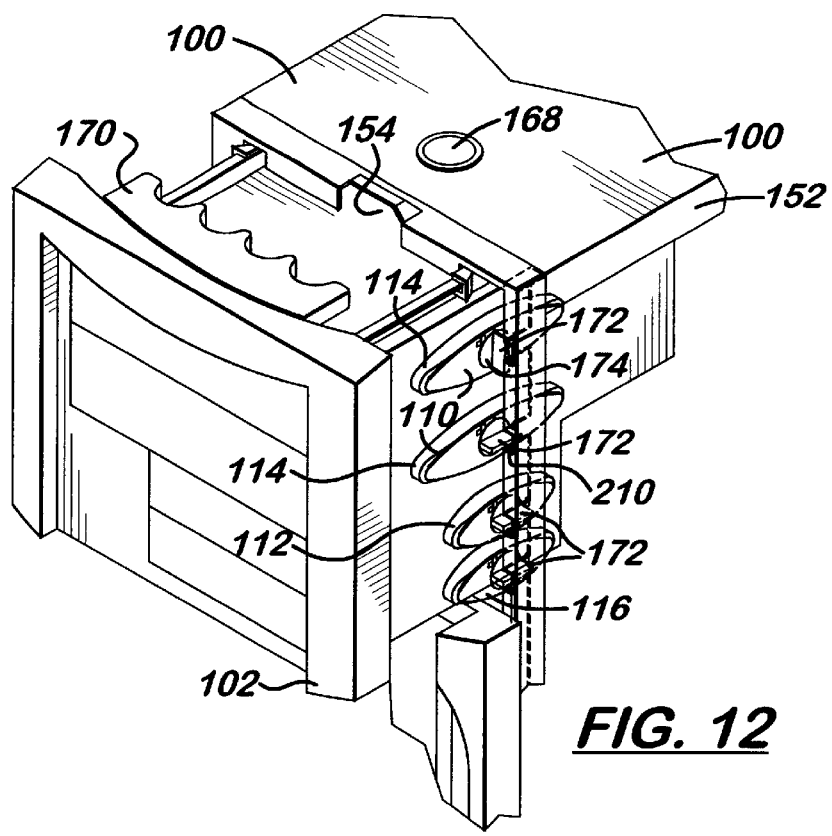
FIG. 12 is an isometric view of the information handling system chassis shown in FIG. 1, wherein the device cage assembly is prevented from being moved to the closed position when one or more device retention assemblies is not properly latched.
Figure 13:
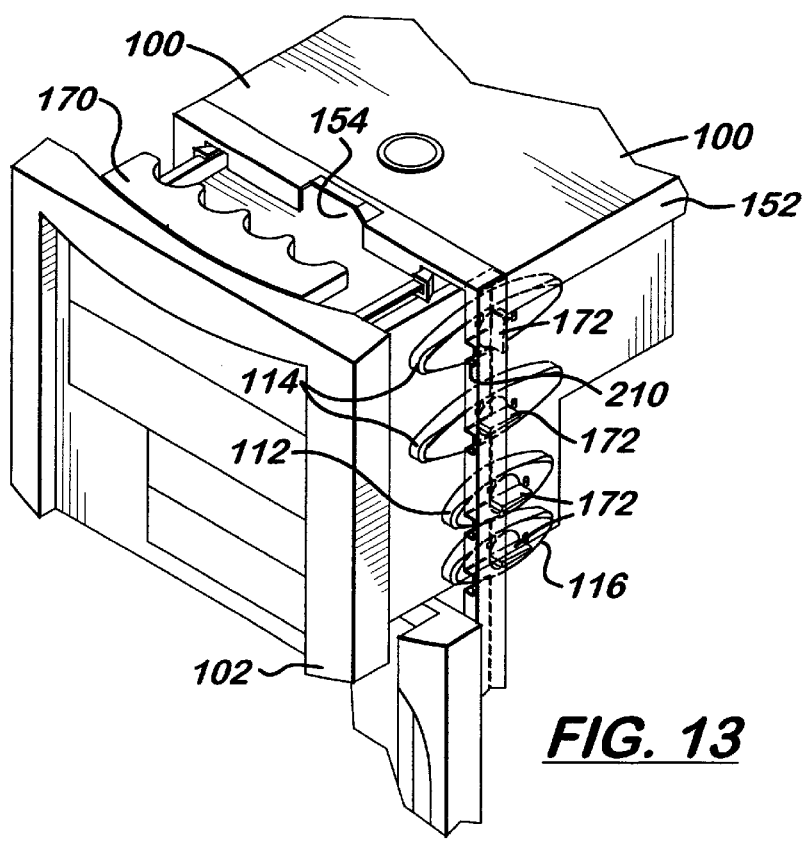
FIG. 13 is an isometric view of the information handling system chassis shown in FIG. 1, wherein the device cage assembly is prevented from being moved to the opened or removed positions when one or more device retention assemblies is not properly latched.

Referring now to FIGS. 12 and 13, the device cage assembly may be prevented from being moved between the opened and closed positions when one or more of the device retention assemblies is not adequately latched. In one embodiment, the chassis frame 152 includes a plurality of slots 210 spaced along one or both sides of aperture 154 and vertically aligned with the device retention assemblies 110 & 112 mounted to device cage 104. The slots 210 are sized to allow the handle portion 174 of knob 172 to pass there through only when the handle portion 174 is longitudinally aligned with the slot 210. Thus, as shown in FIGS. 12 and 13, the handle portion 174 may pass through the slot 210 only when knob 172 is turned to the latched position and latching assembly 118 is latched thereby securing the device retention assembly 110 & 112 to the device cage 104 so that devices contained in the drive bay are securely retained within enclosure 120. In this manner, any unlocked devices are prevented from being accidentally dropped from the device cage 104.

As shown, when device cage assembly 102 is moved between the closed and opened positions, the handle portions 174 pass through the slots 210 if the latching assembly 118 is properly latched so that the knob 172 is turned to the latched position. However, if a device retention assembly 110 is unlatched, as is illustrated by the uppermost device retention assembly 212, the knob 172 must be turned to a latched position before moving the cage to the closed position, since the handle portion 174 will not pass through slot 210, preventing movement of the device cage 104 past the point where the handle portion 174 contacts the chassis frame 152. Thus, if the device retention assembly 212 is unlatched while the device cage 104 is in the extended or open position, the device cage 104 cannot be moved to the retracted or closed position until the unlatched device retaining assembly 212 is latched. Likewise, as shown in FIG. 13, if the device retention assembly 212 is unlatched while the device cage 104 is contained within the chassis, that is, the device cage 104 is in the retracted or closed position, the device cage 104 cannot be moved to the extended or open position. Further, in both instances, the device retention assembly 110 is trapped between side wall portion 126 of enclosure 120 and the member of chassis frame 152 for the rim of aperture 154 and is therefore held against the enclosure 120 so that it remains in engagement with the device contained therein.

In FIGS. 1 through 13, the device cage assembly of the present invention is shown as being implemented in a tower or mini tower type chassis, that is, a chassis having a tall, narrow form factor. However, it will be appreciated by those of skill in the art that the device cage assembly may also be implemented in a chassis having another configuration, such as a "desktop" type configuration having a low, wide form factor, without departing from the scope and spirit of the invention. Further, it should be appreciated that, in alternate embodiments of the invention, the removable device cage of the present invention may utilize conventional fasteners such as screws, bolts, or the like, to provide retention of devices within the device cage. Similarly, the retainer assembly of the present invention may be used with a fixed device cage, and thus should not be construed as being limited to use with the removable device cage of the present invention.

It is believed that the device retention assembly of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A chassis for an information handling system, comprising:
    a device cage assembly capable of holding at least one device, said device cage assembly including:
        a device cage suitable for holding said at least one device; and
        a retainer capable of being attached to said device cage, said retainer being suitable for engaging said at least one device inserted in said device cage for retaining said at least one device in said device cage and including:
            a body suitable for attachment to said device cage;
            an appendage mounted to said body; and
            a latching assembly mounted to said body, said latching assembly including
                a rotary latch having a knob coupled to a keyed shaft suitable for engaging an aperture in said device cage for securing said body to said device cage;
        said appendage being capable of extending into said device cage for engagement with said device held therein when said body is secured to said device cage by said latching assembly; and a frame having an aperture suitable for receiving said device cage assembly formed therein;

wherein said device cage assembly is capable of movement between a retracted position wherein said device cage assembly is substantially contained within said frame, and an extended position wherein said device cage assembly is positioned at least partially outside of said frame.

2. The information handling system chassis as claimed in claim 1, wherein said knob is capable of engaging said frame as said device cage assembly moves between the retracted and extended positions if said latching assembly is unlatched for preventing further movement of said device cage assembly.

3. The information handling system chassis as claimed in claim 1, wherein the device cage assembly is capable of being removed from said frame.

4. The information handling system chassis as claimed in claim 1, wherein said device cage assembly is capable of sliding between the retracted and extended positions.

5. The information handling system chassis as claimed in claim 4, further comprising a locking assembly for securing said device cage assembly in the extended and retracted positions.

6. The information handling system chassis as claimed in claim 5, wherein said locking assembly comprises a spring biased button for engaging an aperture formed in said frame when the device cage assembly is in one of the extended and retracted positions.

7. The information handling system chassis as claimed in claim 4, wherein said device cage assembly comprises a device cage having at least one rail suitable for engaging a channel of said chassis frame.

8. The information handling system chassis as claimed in claim 4, wherein said chassis further comprises a front bezel, and wherein said device cage assembly extends through said front bezel.

9. The information handling system chassis as claimed in claim 4, wherein said device cage assembly comprises an enclosure suitable for holding said device, said enclosure having first and second side wall portions and a front bezel portion, said front bezel portion including an aperture through which said device may be accessed.

10. An apparatus for retaining a device in a device cage of an information handling system chassis, comprising:

a body suitable for attachment to said device cage;

an appendage mounted to said body; and a latching assembly mounted to said body, said latching assembly suitable for securing said body to said device cage;

wherein said appendage is capable of extending into said device cage for engagement with the device held therein when said body is secured to said device cage by said latching assembly so that the device is retained in said device cage; and wherein said latching assembly comprises a rotary latch having a knob coupled to a keyed shaft suitable for engaging an aperture in said device cage.

11. The apparatus as claimed in claim 10, wherein said latching assembly comprises a knob coupled to a keyed shaft suitable for engaging an aperture in said device cage, wherein said knob is coupled to said keyed shafts via a rack and pinion.

12. The apparatus as claimed in claim 11, wherein said keyed shaft and said appendage are coaxial.

13. The apparatus as claimed in claim 10, wherein said appendage comprises a pin.

14. The apparatus as claimed in claim 10, wherein said device cage is capable of movement between a retracted position wherein said device cage is substantially contained within the information handling system chassis, and an extended position wherein said device cage is positioned at least partially outside of the chassis.

15. The apparatus as claimed in claim 14, wherein said knob is capable of engaging the information handling system chassis as said device cage moves between the retracted and extended positions if said latching assembly is unlatched for preventing further movement of said device cage.

16. The apparatus as claimed in claim 15, wherein said knob comprises a flattened handle portion sized to move through a slot formed in said information handling system chassis when said latching assembly is latched.

17. An information handling system, comprising:

a chassis;

a device cage suitable for holding at least one device;

a retaining apparatus suitable for retaining said device in said device cage, said retaining apparatus further comprising:

a body suitable for attachment to said device cage;

a latching assembly mounted to said body, said latching assembly suitable for securing said body to said device cage; and an appendage mounted to said body, said appendage capable of extending into said device cage and engaging said device to retain said device in said device cage;

wherein said device cage is capable of movement between a retracted position wherein said device cage is contained within said chassis, and an extended position wherein said device cage is positioned at least partially outside of said chassis; and wherein said latching assembly comprises a rotary latch having a knob coupled to a keyed shaft suitable for engaging an aperture in said device cage.

18. The information handling system chassis as claimed in claim 17, wherein the device cage is capable of being removed from said chassis.

19. The information handling system as claimed in claim 17, wherein said knob is capable of engaging said chassis as said device cage moves between the retracted and extended positions if said latching assembly is unlatched for preventing further movement of said device cage.

20. The information handling system as claimed in claim 17, wherein said device cage is capable of sliding between the retracted and extended positions.

21. The information handling system as claimed in claim 20, wherein said chassis further comprises a front bezel, and wherein said device cage extends through said front bexel.

22. The information handling system as claimed in claim 20, wherein said device cage comprises an enclosure suitable for holding said device, said enclosure having first and second side wall portions and a front bezel portion, said front bezel portion including an aperture through which said device may be accessed.

23. The information handling system as claimed in claim 20, further comprising a locking assembly for securing said device cage in the extended and retracted positions.

24. The information handling system as claimed in claim 23, wherein said locking assembly comprises a spring biased button for engaging an aperture formed in said chassis when said device cage is in one of the extended and retracted positions.

25. The information handling system as claimed in claim 20, wherein said device cage comprises at least one rail suitable for engaging a channel of said chassis.

* * * * *